Feb. 20, 1962 A. D. PROVENZANO 3,021,884
BOLT LOCKING SLEEVE
Filed June 3, 1959

INVENTOR:
ARTHUR D. PROVENZANO
BY
Eldon H. Luther
ATTORNEY

United States Patent Office 3,021,884
Patented Feb. 20, 1962

3,021,884
BOLT LOCKING SLEEVE
Arthur D. Provenzano, Chattanooga, Tenn., assignor to Combustion Engineering, Inc., New York, N.Y., a corporation of Delaware
Filed June 3, 1959, Ser. No. 817,912
1 Claim. (Cl. 151—8)

This invention relates to a bolt locking device and has particular relation to such a device operative to prevent unthreading of the nut from the bolt and also to prevent separation of the two halves of the bolt should the bolt for some reason fracture or fail while in place.

In accordance with the invention the novel and improved locking organization includes a sleeve which is received within the bore of the structural members that are to be bolted together by means of a suitable bolt with each end of the sleeve being provided with a plurality of fingers which are bent radially outward in overlying relation of the outer surface of these structural members. Positioned within and extending throughout the sleeve is the shank of a bolt with the head of the bolt resting against the fingers at one end while a nut that is threaded upon the bolt rests against the fingers at the other end. Both the head of the bolt and the nut are non-circular in transverse cross section, as for example, hexagonal or square, as is conventional, and the fingers are bent up and over the bolt head and the nut so that they extend across a portion of the outer face of the head and nut and the fingers are so disposed with relation to the transverse configuration of the bolt head and nut so that they lie flat against a flat surface or side thereof. With this arrangement the nut is prevented from unthreading from the bolt and if the bolt shank should fracture because of being unduly stressed the two halves of the bolt will remain in place and will not fall into any adjacent machinery or become entrained in any process stream.

It is an object of this invention to provide an improved bolt locking device.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein.

Figure 2:
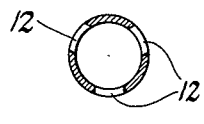
FIG. 2 is an end view of the sleeve of FIG. 1.
Figure 3:
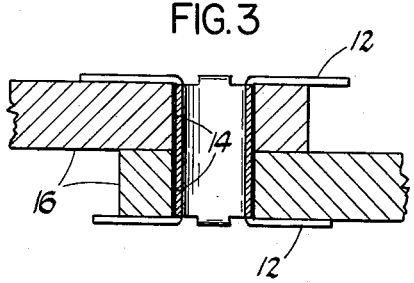
FIG. 3 is a view of the sleeve positioned within the aligned bores or apertures of a pair of plates or structural members with the fingers of the sleeve being bent radially outward in overlying relation with the outer surface of these plates.
Figure 1:
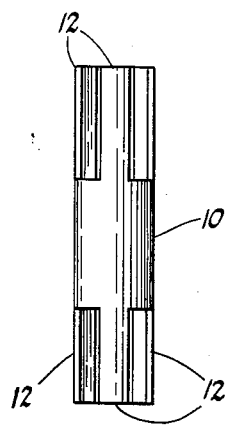
FIG. 1 is an elevational view of the bolt locking sleeve in its initial form prior to being positioned within the bore in a structural organization.
Figure 4:
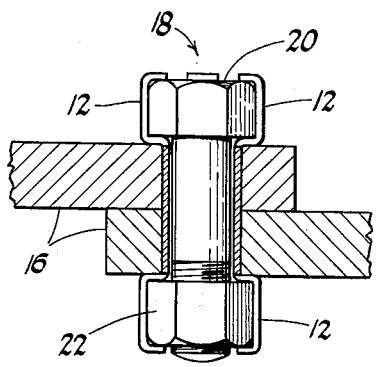
FIG. 4 is a view similar to that of FIG. 3 but shows the bolt in place with the fingers of the sleeve bent over the nut and head of the bolt in locking position.
Figure 5:
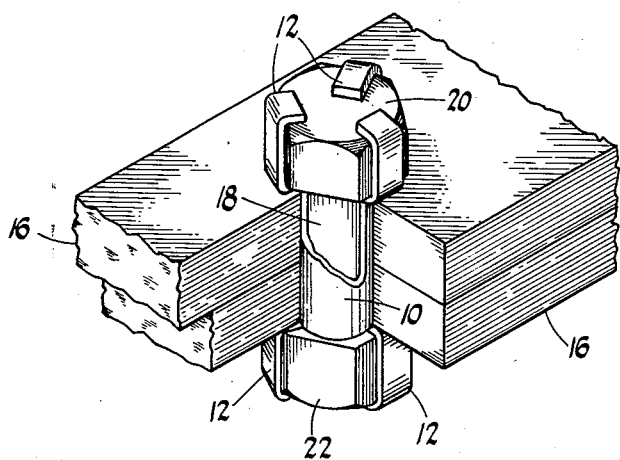
FIG. 5 is a perspective view of the assembled organization of FIG. 4 with this view being partially broken away to show details of construction.

Referring now to the drawing, wherein like reference characters are used throughout to designate like elements, the illustrative and preferred embodiment of the invention depicted therein includes sleeve 10 provided with fingers 12 at each end. The sleeve is inserted within the aligned bores 14 in plate or structural members 16 which are to be bolted together. The length of the sleeve is such that the fingers 12 extend from the bores at each end substantially the full length of the fingers and these fingers are bent radially outward so that they lie in flat overlying relation with the outer surface of plates 16 as shown in FIG. 3. Bolt 18 is then inserted within sleeve 10 with the shank of this bolt being only slightly smaller than the inside diameter of the sleeve so that it fits snugly but is easily slidable through the sleeve with head 20 of the bolt having its inner shoulder engaging the outwardly extending fingers. Nut 22 is then threaded on the bolt and tightened down with the inner end of the nut engaging the fingers at the other end of the sleeve. The fingers 12 at each end of the sleeve are then bent over the head of the bolt and the nut, respectively, so that they occupy the position shown in FIGS. 4 and 5.

In the illustrative organization the bolt head and the nut are hexagonal in transverse cross section and there are three fingers provided at each end of the sleeve equally spaced circumferentially such that they overlay a flat side of the head and nut. The configuration of the bolt head and the nut may, of course, be other than hexagonal and the fingers are arranged in relation to whatever configuration is employed so that they lie in flat overlaying relation with a side of the head and nut.

By extending the fingers when in the locked position so that they overlay a portion of the outer surface of the bolt head and nut the two halves of the bolt will be retained in position should the bolt become fractured while in place.

Accordingly it will be seen that with this invention the locking means is effective to prevent the nut from becoming loose or unthreaded from the bolt and additionally if the bolt should fail the two halves will be retained in position.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

A bolt assembly for structural members having aligned apertures comprising a sleeve extending through the apertures and having at least three outwardly turned fingers overlying the surface of the members at each end of the aligned apertures, a bolt the shank of which extends through said sleeve with the head of the bolt engaging the fingers at one end of the sleeve, a nut threaded on the bolt and engaging the fingers at the other end, said fingers being bent over the respective head and nut with the fingers extending along the side and over a portion of the outer face thereof, said head and nut being polygonal in transverse section and the fingers being related thereto so that they are in flat overlying relation with the side thereof with the relative angular disposition of the fingers being such that the angle between each pair of adjacent fingers, taken circumferentially in either direction from any finger is less than 180° so as to prevent removal of the head or the nut should the bolt be severed.

References Cited in the file of this patent

UNITED STATES PATENTS

| 1,570,874 | Brumfield | Jan. 26, 1926 |
| 1,577,946 | Boutwell | Mar. 23, 1926 |
| 2,317,347 | Saylor | Apr. 27, 1943 |